(12) United States Patent
Mathur et al.

(10) Patent No.: US 8,023,982 B2
(45) Date of Patent: Sep. 20, 2011

(54) WIRELESS COMMUNICATION DEVICE HAVING DYNAMICALLY ESCALATED MEDIA TRANSMISSION HANDLING

(75) Inventors: Vaibhav Mathur, San Diego, CA (US);
Biren Patel, San Diego, CA (US);
Kavitha Vallari Devara, La Jolla, CA (US); Mark Aaron Lindner, Superior, CO (US)

(73) Assignee: Qualcomm Incorporated, San Diego, CA (US)

( * ) Notice: Subject to any disclaimer, the term of this patent is extended or adjusted under 35 U.S.C. 154(b) by 672 days.

(21) Appl. No.: 12/119,049

(22) Filed: May 12, 2008

(65) Prior Publication Data

US 2009/0280850 A1     Nov. 12, 2009

(51) Int. Cl.
*H04B 7/00* (2006.01)
(52) U.S. Cl. ......................................................... 455/518
(58) Field of Classification Search .................... 455/518
See application file for complete search history.

(56) References Cited

U.S. PATENT DOCUMENTS

| | | | |
|---|---|---|---|
| 7,151,764 B1 | 12/2006 | Heininen et al. | |
| 2004/0162061 A1* | 8/2004 | Abrol et al. | 455/414.1 |
| 2006/0046760 A1* | 3/2006 | Bertino et al. | 455/519 |
| 2006/0165074 A1 | 7/2006 | Modi et al. | |
| 2007/0195735 A1 | 8/2007 | Rosen et al. | |

FOREIGN PATENT DOCUMENTS

EP     1909464     4/2008

OTHER PUBLICATIONS

Abhishek Roy et al: "An Information Theoretic Framework for Predictive Channel Reservation in VoIP over GPRS" International Journal of Communication Systems Wiley UK, vol. 19, No. 4, May 2006, pp. 463-489, XP002544087, Issn: 1074-5351, p. 464, p. 467.
Woodside C M et al: "General Bypass Architectures for High-Performance Distributed Applications" Data Communications and their Performance. Proceedings of the Sixth IFIP WG6.3 Conference on Performance of Computer Networks Chapman & Hall London, UK, 1996, pp. 51-65, XP002544088, ISBN: 0-412-73250-5 the whole document.
International Search Report, PCT/US2009/042950, International Searching Authority, European Patent Office, Sep. 18, 2009.
Written Opinion, PCT/US2009/042950, International Searching Authority, European Patent Office, Sep. 18, 2009.

* cited by examiner

*Primary Examiner* — Duc Nguyen
*Assistant Examiner* — Ankur Jain
(74) *Attorney, Agent, or Firm* — Raphael Freiwirth

(57) ABSTRACT

A wireless communication device that dynamically escalates media transmission handling on the resident computer platform operating system through passing priority data bundles that include media directly from an application programming interface to the wireless communication interface. The application programming interface generates an outgoing priority data bundle including media, and a media handler directs the outgoing priority data bundle directly to the wireless communication interface for transmission without handling of the outgoing priority data bundle by other software layers of the operating system. The same priority handling can be done with incoming data bundles received at the wireless communication interface and being sent to an application programming interface.

23 Claims, 6 Drawing Sheets

WIRELESS COMMUNICATION DEVICE HAVING DYNAMICALLY ESCALATED MEDIA TRANSMISSION HANDLING

BACKGROUND OF THE INVENTION

1. Field of the Invention

The present invention relates to wireless communications systems. More specifically, the present invention relates to a wireless communication device and method for escalating the media handling of applications resident on the computer platform of a wireless communication device.

2. Description of the Related Art

Modern wireless communication devices, such as cellular phones, PDAs, mini-laptops, and advanced pagers, typically communicate over long distances by bridging telephone calls through existing cellular telephone networks and passing data packets across the network. These wireless devices often have limited to significant data processing and computing capability, and can accordingly send and receive software programs, in addition to voice, across the telephone network and perform advanced computer functions.

Some of these wireless communication devices have a computer platform which has a resident operating system with one or more software layers or objects that interact with active programs executing on the computer platform. One problem with the use of an advanced, multi-layered operating system on the wireless device computer platform is that there can be a significant delay in executing applications and passing data among various applications. The delay can hamper time sensitive data handling on the computer platform and interrupt communications.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

In particular regard to PTT communications, specific handling of voice packets is often done with a queue for transmission from the device, and a general resident application of the operating system will handle the transfer of the media packets to and from the queue. The general application will invoke another application to exchange frames with a Vocoder and will queue frames to compensate for the non-real time transmission of the PTT communication. This delay can cause "jitter" in the outgoing voice "talk spurt."

Accordingly, it would be advantageous to provide a wireless computer device that can escalate the handling of very time sensitive, priority data, such as PTT communications, from its computer platform without invoking all layers of the resident operating system. The escalation of handling of priority data, such as media, should be accomplished without compromising other resources of the wireless communication device. It is thus to the provision of such a wireless communication device with dynamic escalation of priority data that the present invention is primarily directed.

SUMMARY OF THE INVENTION

Briefly described, the present invention is a wireless communication device that dynamically escalates media transmission handling on the resident computer platform operating system through passing priority data bundles that include media directly from an application programming interface to the wireless communication interface. For an application programming interface that utilizes priority data bundle including media, such as PTT voice and other group communications, where data handling and transmission is extremely important for continuity of communication, a media handler directs the outgoing priority data bundle directly to the wireless communication interface for transmission without handling of the outgoing priority data bundle by other software layers of the operating system. In one embodiment, the same priority handling can be done with incoming data bundles received at the wireless communication interface that are being sent to an application programming interface.

In one embodiment, the wireless communication device has a computer platform including an operating system that has a plurality of layers including an application programming interface that is configured to handle media and generate an outgoing priority data bundle including media. The device also has a wireless communication interface, and more than one layer of the plurality of layers is configured to handle media transmitted from the application programming interface to the wireless communication interface. The device includes a media handler that dynamically escalates media transmission handling through sending an outgoing priority data bundle from the application programming interface directly to the wireless communication interface without handling of the outgoing priority data bundle by other software layers of the operating system, which is advantageous for the handling and processing of time sensitive data.

In one embodiment, the method of dynamically escalating media transmission handling on a wireless communication device having a computer platform with an operating system and a wireless communication interface, with the operating system including a plurality of layers including an application programming interface that handles media and more than one layer of the plurality of layers configured to handle media transmitted from the application programming interface to the wireless communication interface, includes the steps of generating an outgoing priority data bundle including media at an application programming interface, sending the outgoing priority data bundle directly to the wireless communication interface without handling of the outgoing priority data bundle by other software layers of the operating system, and transmitting the outgoing priority data bundle from the wireless communication interface.

The present wireless communication device is therefore advantageous in that it is able to expedite the handling of priority data without potential delay from invoking various layers of resident software. The wireless communication device allows PTT communication setup through simple modification of data in a handled data packet. In such manner, the wireless communication device expedites call transmission and/or reception without unduly compromising the resources for other device functions.

Other objects, features, and advantages of the present invention will become apparent after review of the Brief Description of the Drawings, Detailed Description of the Invention, and the claims.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Figure 1:
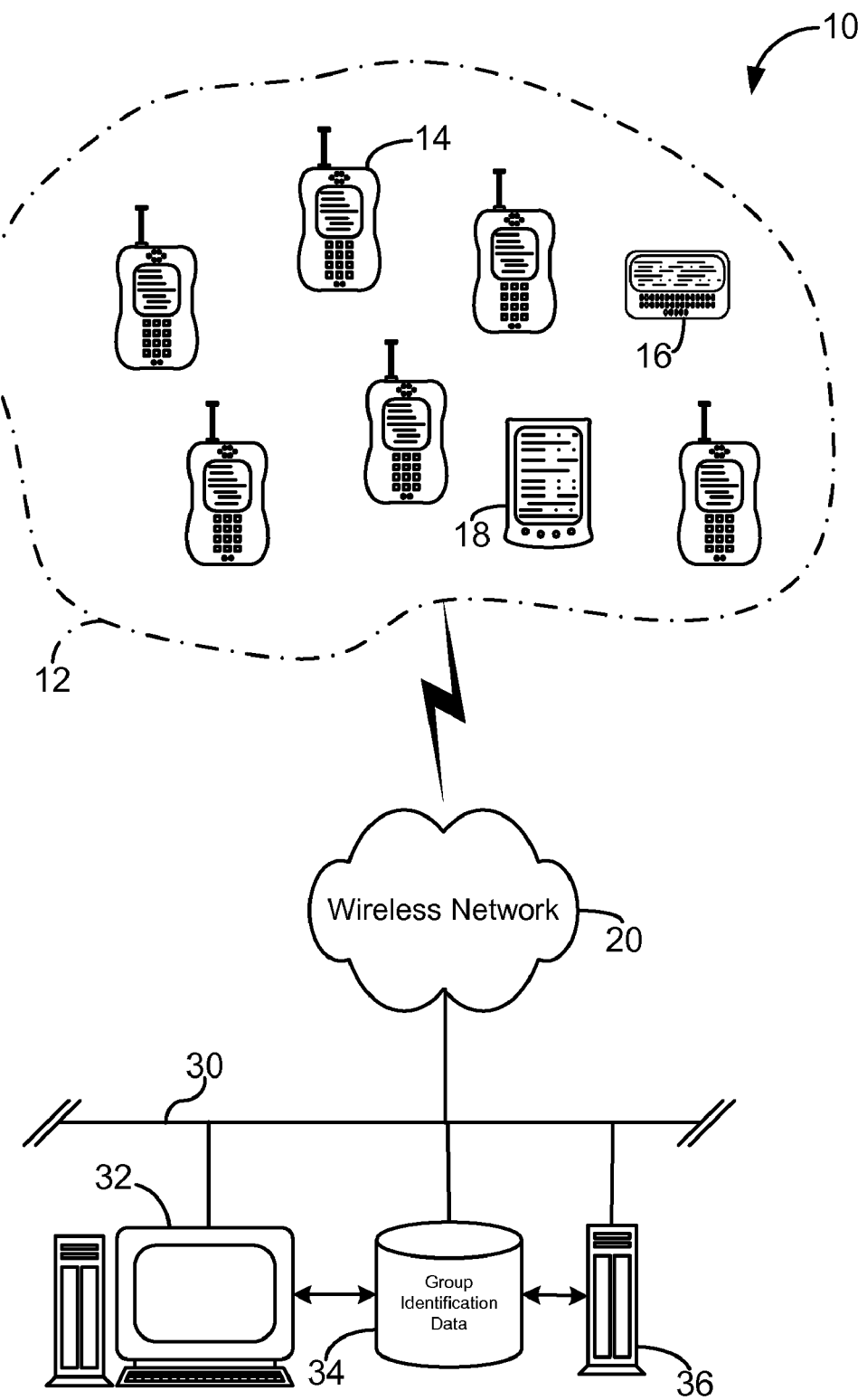
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of a system 10 with a group communication server 32 to one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

The group communication can be voice, applications, graphic media, such as pictures in JPEG, TIF, and the like, or audio files such as MP3, MP4, WAV, and the like. The media can also be streaming media, such as a multimedia application (Powerpoint, MOV file, and the like). Also, the group communication is typically half-duplex audio conferencing among members of the communication group 12.

Figure 2:
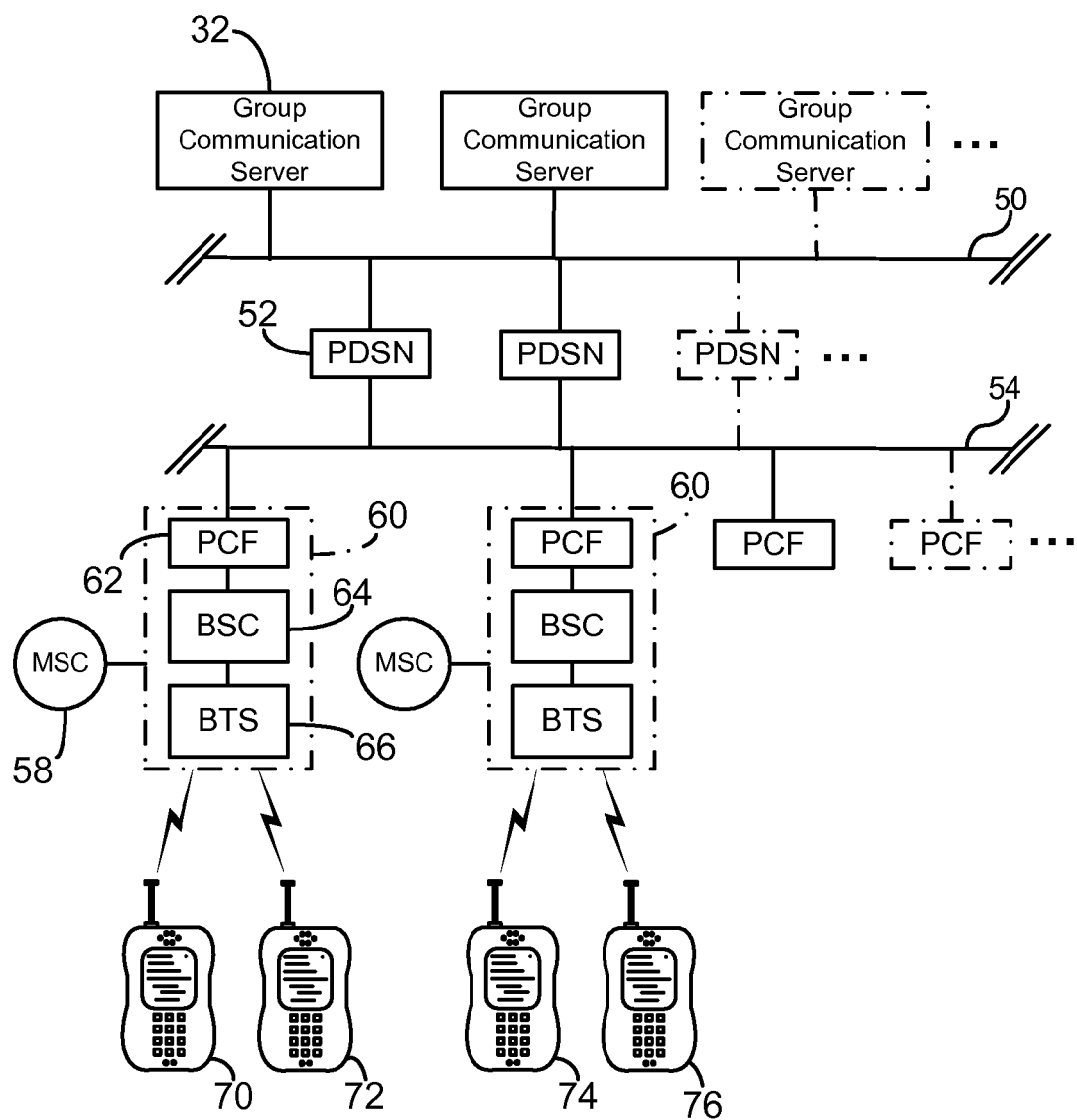
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or be at the control of, the group communication server 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
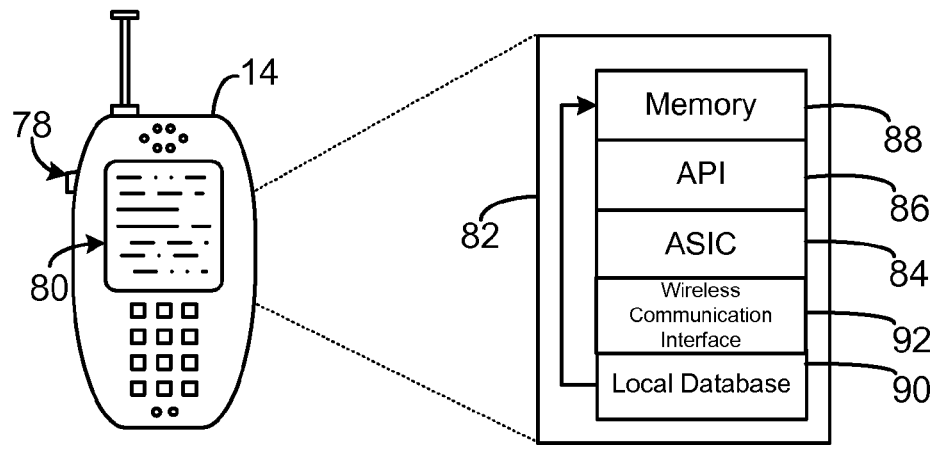
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 82 also includes a wireless communication interface 92 that can open the direct communication channel from the wireless device, typically for the half-duplex voice communication in a PTT call. The wireless communication interface 92 can also be part of the standard communication interface for the wireless device which ordinarily carries the voice and data transmitted to and from the wireless device. The wireless communication interface 92 typically is comprised of hardware as is known in the art.

Figure 4:
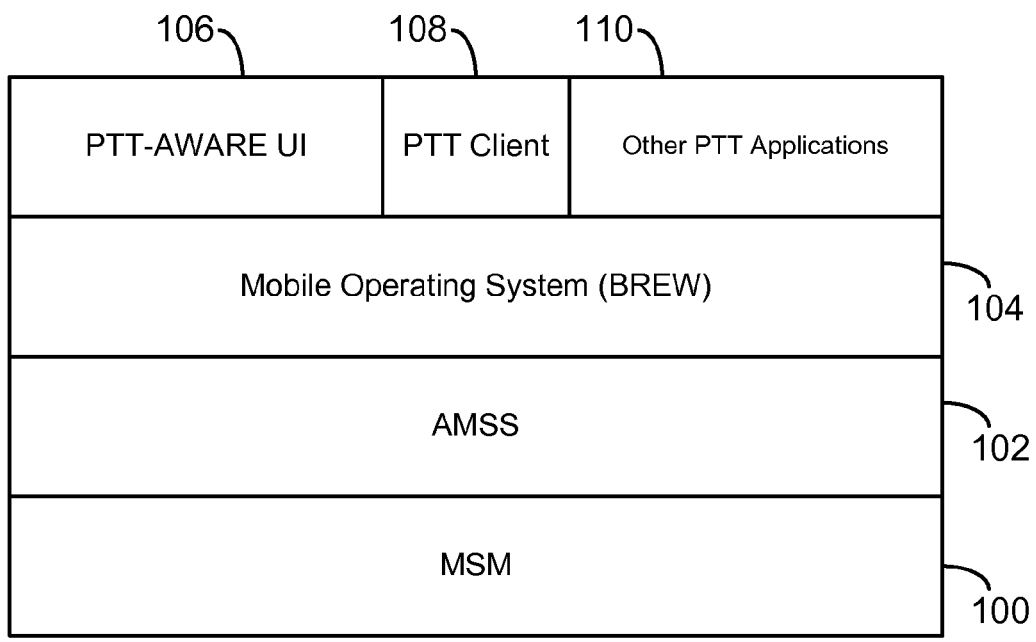
FIG. 4 is a block diagram of one embodiment of the various layers resident on the computer platform of the wireless communication device.

FIG. 4 is a diagram of one embodiment of the software layers resident on the computer platform 82 of the wireless communication device 14, with a PTT facility and a group-directed communication facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM®, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the other PTT applications 110. In addition to providing access to PTT services with the PTT Client 108, the PTT Client 108 can act as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

In one embodiment, a media handler will provide direct access to the external communication interface, or here, an AMSS 102 interface. The media handler responds to PTT requests for group-directed services by invoking the appropriate APIs, such as those from other resident PTT and group media applications 110, and can service the requests from the user and informs the user the result of any group-directed media request.

Figure 5:
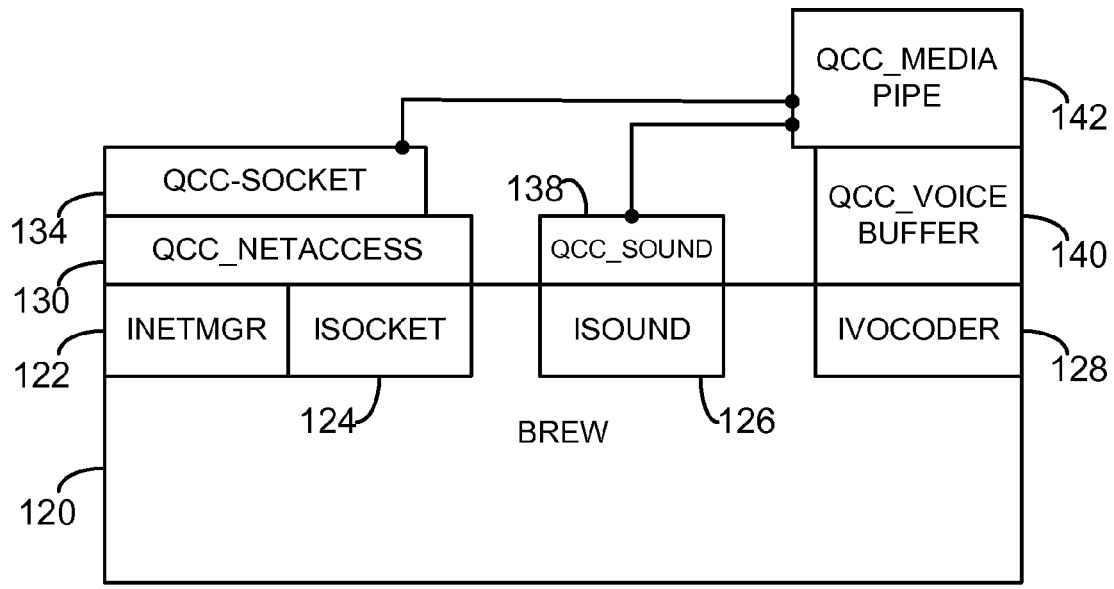
FIG. 5 is a block diagram of one embodiment of several components that exist in the Qchat® architecture of the BREW® operating system.

FIG. 5 is a block diagram of one embodiment of several components that exist in the Qchat® architecture of the BREW® operating system of QUALCOMM. Here, the BREW operating system 120 includes several components to include IVOCODER 128 (Vocoder usage); ISOUND 126 (audio usage); ISOCKET 124 (provides a socket for communication) and INETMGR 122 (internet functionality). The Qchat layer (QCC prefix), which here includes a PTT functionality, includes the components of Socket 134 which provides services for socket connections; NetAccess 130 which provides an access point to and information about the network; Sound 138; Media Pipe 142 which bundles outgoing media packets and unbundles incoming media packets, and also adds and strips the RTP header information; and Voice-Buffer 140.

In particular, the Vocoder-related media components function with the MediaPipe 142 extracting frame data from media packets, will mute and unmute the sound path, track talk-spurt specific information and provides the status to MediaMgr 144. The Sound 126 components is that utility class for accessing and configuring the sound path. The voice buffer 140 maintains transmission and return buffers for individual frames, sorts received frames based upon RTP sequence number and interleaving information, and scatters frames into interleaved positions for media transmission. The voice buffer also starts and stops IVocoder 128, including monitoring buffer depths and watermarks.

Figure 6:
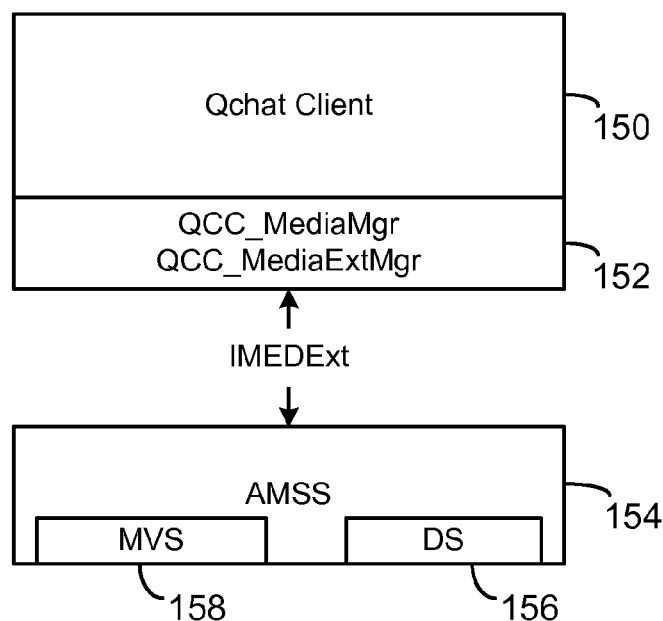
FIG. 6 is a block diagram of one embodiment of the Qchat client and extensions interacting with the wireless interface.

FIG. 6 is a block diagram of one embodiment of the Qchat client and extensions interacting with the wireless interface. Here the Qchat client 150, and MediaMgr and MediaExtMgr 152 interaction directly with the AMSS data services layer and the vocoder DSP. The wireless communication device 14,16,18 prioritizes handling of QChat media by CPU when concurrent BREW apps may hog the CPU and stall voice playout, for example, such situation may occur when a user is playing a game and places a PTT call. Raw frame and media packet exchange will be done substantially in real-time in a higher priority task than the general UI task. In the AMSS component 154, there is an MVS (multi-mode voice services) 158 and as DS (data services) 156 interface.

In this embodiment, a "Media Extension" is used to escalate the media handling. The IMedExt static extension interface APIs replace the typical media handling functionality on the OS. Other media extension interface APIs are used herein to assist in the escalation. For example: Configuring Session APIs: OpenSession, StartVocoder, SetRemoteinfo, Closesession Info, all of which configure the media session; Speaking Mode APIs: Startspeaking, DoneSpeaking, which will allows talk spurts to be escalated; Listening Mode APIs: SetListening, SetMuting, which allow escalation of incoming transmissions; Registering Callback APIs: RegisterVoiceStatusCB, which will indicate caller information; and a Provisioning API: SetNwWaterMark, which will tell other devices when the end of the transmission is.

Figure 7:
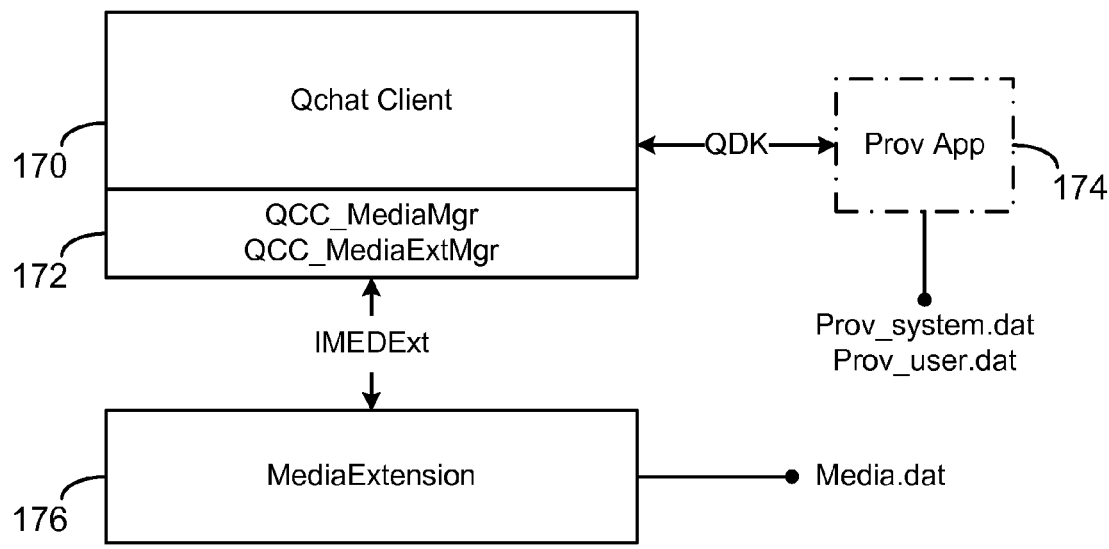
FIG. 7 is a block diagram of one embodiment of the Qchat client implementing a provisional application with a direct route to send priority data bundles to the wireless communication interface.

FIG. 7 is a block diagram of one embodiment of the Qchat client 170 implementing a provisional application 174 with a direct route to send priority data bundles to the wireless communication interface. Here, media extension provisionable items are differentiated into two categories: those set through a Provisional API e.g. De-jitter buffer size, Playout end wait timer duration where the QCHAT client 170 will use a provisional application as a media handler, which will set the appropriate file extensions to the media. The second category are those items set internally through a .dat file, e.g. Voice buffer size. Here the Qchat client 150, and MediaMgr and MediaExtMgr 152 interact directly with the Media Extension 176, which here will append the appropriate .dat file to the escalated media.

Figure 8:
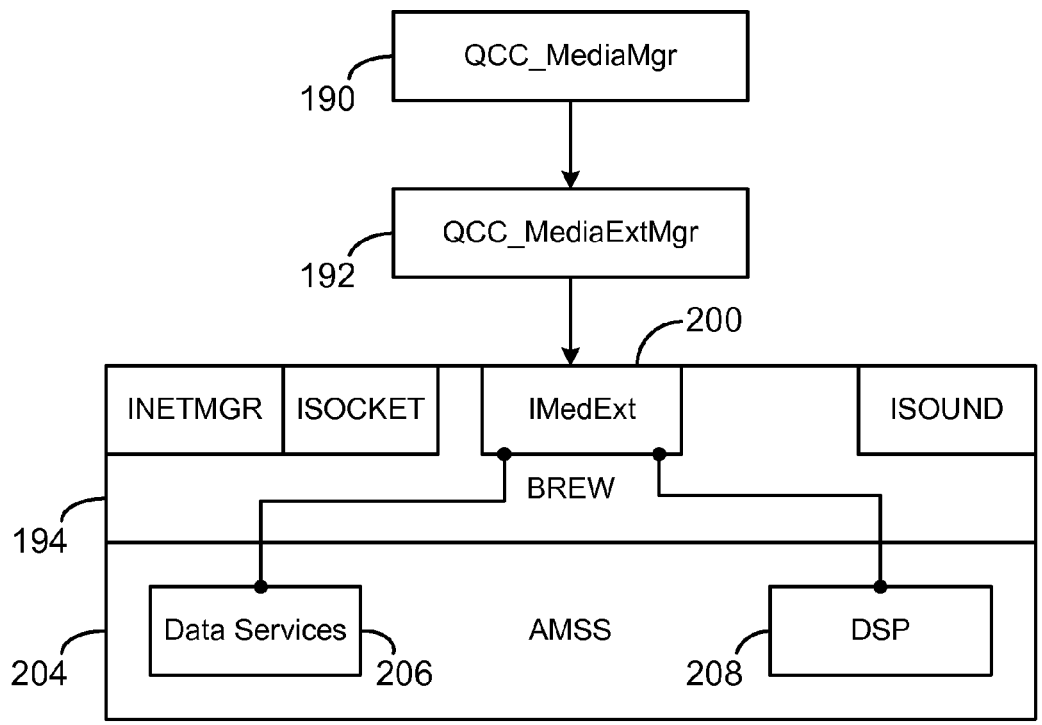
FIG. 8 is a block diagram of one embodiment of the architecture for escalating media transmission.

FIG. 8 is a block diagram on one embodiment of the architecture for escalating media transmission. In this embodiment, a IMedExt interface 200 sits in the OEM layer. QCC MediaExtMgr 192 is a new object added to the QChat client that interacts with the MediaMgr 190 and the IMedExt 200 component of BREW 194. Media Extension uses DS and MVS APIs alternatively to the Socket 298 and IVocoder (128 in FIG. 5) interfaces. The packing and unpacking of media runs in the context of Data Services (DS) 206 task in AMSS 204, which also utilizes the resident DSP (digital signal processing) 208. Prioritization can be escalated per talk spurt basis or per call basis and can be subject to other local performance analysis. In operation, the IMedExt 200 API posts a command to the DS 206 task, and the DS task switches its priority to a value higher than the UI task so that it processes the new command. On the Transmission side, input speech is processed on a 20 ms frame basis by a vocoder task to generate voice packets, the DS 206 task bundles the voice packet with a RTP header and forwards the RTP packet. On the reception side, after the post of an event, the DS task processes the incoming packet, extracts the RTP header from payload and forwards the payload to the vocoder task, which decodes and plays out the speech frames.

Figure 9:
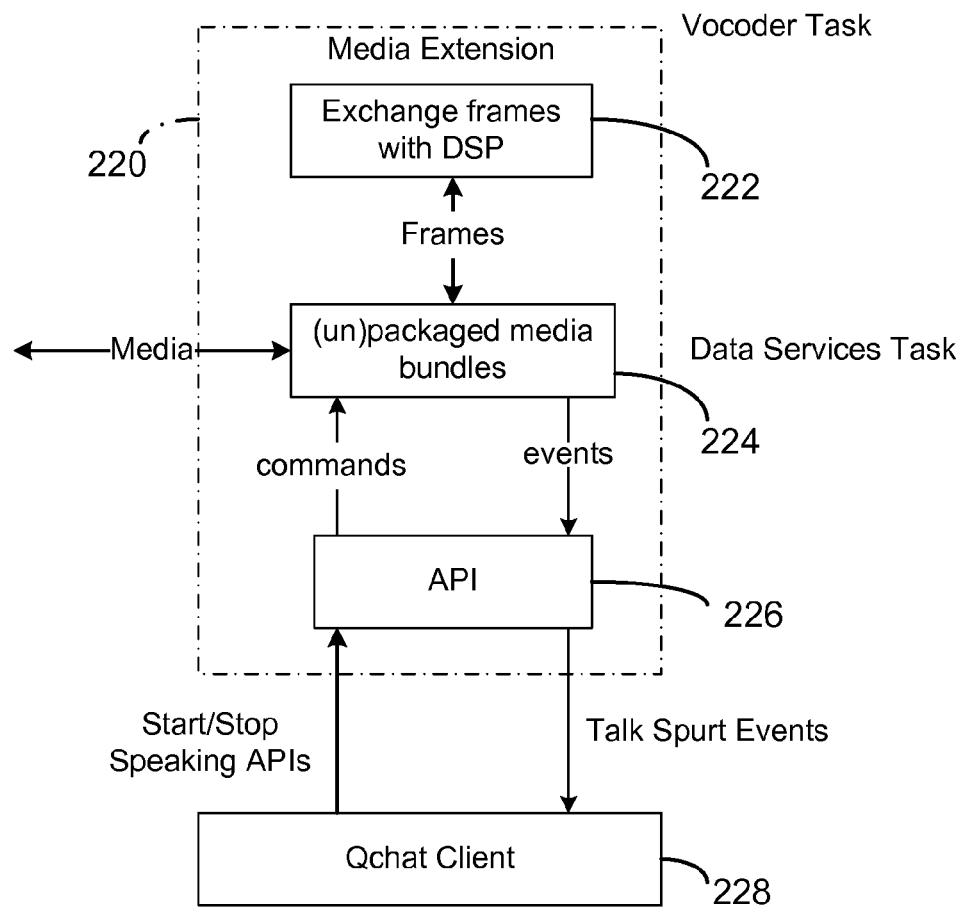
FIG. 9. is a data flow diagram for one embodiment of a media extension API.

FIG. 9. is a data flow diagram for one embodiment of a media extension API. Media Extension 220 APIs reside in the UI task. All commands are posted through the UI task and Media and raw frames are exchanged at the level of the DS task and the vocoder task oblivious to the UI task. Frames are exchanged with the DSP (step 222) and the media bundles are packaged and unpackaged 224 with the Media Extension API 226. In this embodiment, the Qchat client 228 sends start and stop APIs to the Media Extension API 226 where the escalation of media is accomplished. There are several AMSS APIs in this embodiment to facilitate the handling of the data:

DS (156 in FIG. 5) APIs:

| API: | Function |
| --- | --- |
| dss_socket | Opens a Socket |
| dss_bind | Binds Socket |
| dss_sendto | Sends UDP packet through a Socket |
| dss_recvfrom | Receives UDP packet through the Socket |
| dss_close | Closes Socket |

MVS (158 in FIG. 5) APIs:

| API: | Function: |
| --- | --- |
| mvs_acquire | Acquires MVS for device use |
| mvs_standby | Prepares specified vocoder for use and waits for mvs-enable( ) |
| mvs_enable | Enables a client to transfer packets with a specified vocoder mode |
| mvs_listen | Enables a client to listen to packets |
| mvs_release | Releases MVS for others to use |
| mvs_mode-supported | Returns whether the requested mode is supported |

Figure 10:
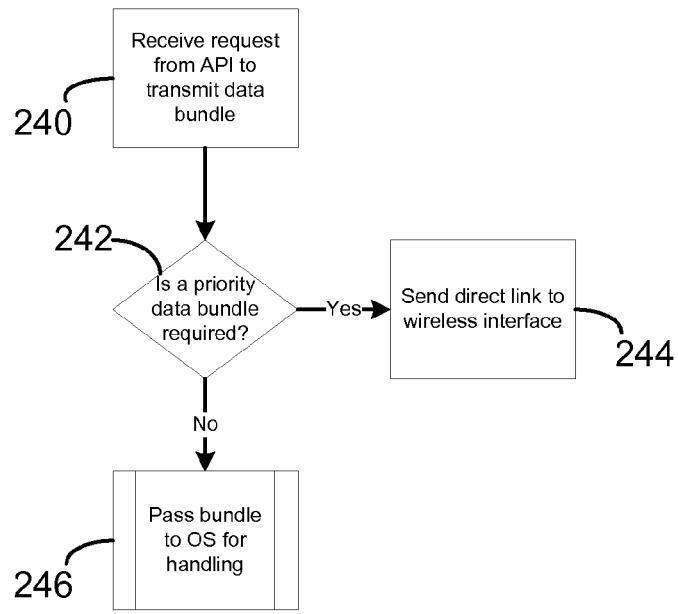
FIG. 10 is a flowchart of one embodiment of a process for a media handler selectively assigning a wireless interface link to an API.

The use of the various embodiments of the media escalation can optimally eliminate a Vocoder interface delay of 120 ms from the various layers handling media bundles. Furthermore, the performance improvement when QChat is executing concurrently with multiple applications will be achieved as the priority media is escalated, and other applications resident on the computer platform 82 can invoke the IMedExt APIs and use the Media Extension on a dynamic or static application independently FIG. 10 is a flowchart of one embodiment of a process for a media handler selectively assigning a wireless interface link to an API. The media handler receives a request from an API to transmit a data bundle, shown at step 240, and then a decisions is made as to whether the data bundle will be a priority data bundle requiring escalation, as shown at decision 242. If escalated transmission of the data bundle is needed, the data bundle is sent to the wireless interface for transmission, such as by appending a priority file extension, as shown at step 244. Otherwise, if the data bundle will not be a data bundle at decision 242, the data bundle is passed to the OS (such as BREW) for ordinary handling, as shown at predefined process 246.

In overview, the wireless communication device 14,16,18 includes a computer platform 82 including an operating system 104 that has a plurality of layers including an application programming interface configured to handle media and generate an outgoing priority data bundle including media. A wireless communication interface 92 is also resident thereupon or in communication therewith, and more than one layer of the plurality of layers is configured to handle media transmitted from the application programming interface to the wireless communication interface 92. A media handler (such as Media Extension 176 in FIG. 7 or 220 in FIG. 9) is configured to dynamically escalate media transmission handling through sending an outgoing priority data bundle from the application programming interface directly to the wireless communication interface 92 without handling of the outgoing priority data bundle by other software layers of the operating system.

The media handler can be further configured to generate an outgoing group communication to other wireless communication devices 14,16,18 in a predetermined communication group 12, and the such group communication can be a talk spurt. In one embodiment, the media handler assigns a port to the application programming interface for media sent therefrom, or alternately, can assign a socket for escalated transmission. The application programming interface can selectively yield control of the wireless communication interface to another application programming interface, and the media handler can prioritize which API should have priority. The media handler can further send an incoming data bundle at the wireless communication interface directly to an application programming interface without handling of the incoming data bundle by other software layers of the operating system, thereby allowing a priority receipt of a transmission. It should also be noted that a buffer can be used to store both incoming and outgoing priority transmissions when so embodied.

It can thus be seen that the wireless device 14,16,18 also provides an inventive method for dynamically escalating media transmission handling on a wireless communication device 14,16,18 including the steps of generating an outgoing priority data bundle including media at an application programming interface, sending the outgoing priority data bundle directly to the wireless communication interface without handling of the outgoing priority data bundle by other software layers of the operating system, and transmitting the outgoing priority data bundle from the wireless communication interface 92. The generating of an outgoing priority data bundle is generating an outgoing group communication to other wireless communication devices in a predetermined communication group 12, such as a talk spurt in a group voice communication. The sending of the outgoing priority data bundle directly to the wireless communication interface 92 can accomplished by assigning a port to the application programming interface for media sent therefrom, by assigning a socket to the application programming interface, or other methods of data transmission as known in the art.

The application programming interface can selectively yield control of the wireless communication interface to another application programming interface. An object in one of the plurality of layers, such as a media handler, can assign an application programming interface to the wireless communication interface 92, which can be in a prioritized manner for transmission of the outgoing data bundle. The method can also include sending an incoming data bundle including media at the wireless communication interface 92 directly to an application programming interface without handling of the incoming data bundle by other software layers of the operating system 104. If so embodied, the method can include sending the outgoing priority data bundle to a buffer, then sending the outgoing data bundle from the buffer to the wireless communication interface 92.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method of dynamically escalating media transmission handling on a wireless communication device having a computer platform with an operating system and a wireless communication interface, the operating system including a plurality of layers including an application programming interface that handles media, comprising:
generating an outgoing priority data bundle including media at an application programming interface;
escalating a priority of the outgoing priority data bundle for processing at a processor such that the outgoing priority data bundle is processed at the processor before other data; and
transmitting the outgoing priority data bundle from the wireless communication interface;
establishing a media session at a media application running on the operating system, wherein the outgoing priority data bundle is for the media session;
sending a command from the application programming interface to a service task in the processor to indicate that the outgoing priority data bundle for the media session is to be prioritized; and
wherein escalating the priority of the outgoing priority data bundle is in response to the command and further comprises escalating a first priority value of a first task corresponding to processing the outgoing priority data bundle to have a higher priority level than a second priority value of a second task corresponding to processing the other data at the service task, wherein the other data corresponds to a general application running on the operating system and which runs concurrently with the media application, such that transmission of the outgoing priority data bundle is not interrupted by the other data of the general application.

2. The method of claim 1, wherein the generating of the outgoing priority data bundle comprises generating an outgoing group communication to other wireless communication devices in a communication group.

3. The method of claim 2, wherein the generating of the outgoing priority data bundle comprises generating a talk spurt.

4. The method of claim 1, further comprising selectively assigning a port to the application programming interface for media sent therefrom.

5. The method of claim 1, further comprising selectively assigning a socket to the application programming interface for media sent therefrom.

6. The method of claim 1, further comprising the application programming interface or another application programming interface selectively yielding control of the wireless communication interface according to a respective application programming interface priority.

7. The method of claim 1, further comprising sending the outgoing priority data bundle to a buffer, then sending the outgoing priority data bundle to the wireless communication interface.

8. The method of claim 1, wherein an object in one of the plurality of layers selectively assigns the application programming interface a direct link to the wireless communication interface based on a request from the application programming interface to transmit the outgoing priority data bundle.

9. The method of claim 1, further comprising sending an incoming data bundle including media at the wireless communication interface directly to the application programming interface or another application programming interface without handling of the incoming data bundle by other software layers of the operating system.

10. The method of claim 1, wherein the generating of the outgoing priority data bundle comprises a talk spurt in a group voice communication call to other wireless communication devices in a communication group, and wherein escalating the priority of the outgoing priority data bundle is based on prioritizing at least one of the call or the talk spurt.

11. The method of claim 1, further comprising:
appending a priority file extension to the outgoing priority data bundle; and
prioritizing transmission of the outgoing priority data bundle based on the priority file extension.

12. The method of claim 1, further comprising sending the outgoing priority data bundle directly to the wireless communication interface without handling of the outgoing priority data bundle by other software layers of the operating system.

13. A wireless communication device, comprising:
a computer platform including an operating system and a processor, the operating system including a plurality of layers including an application programming interface configured to handle media and generate an outgoing priority data bundle including media;
a wireless communication interface;
a media handler configured to dynamically escalate media transmission handling through escalating a priority of the outgoing priority data bundle for processing at the processor such that the outgoing priority data bundle is processed before other data; wherein the media handler is further configured to:
establish a media session at a media application running on the operating system, wherein the outgoing priority data bundle is for the media session;
send a command from the application programming interface to a service task in the processor to indicate that the outgoing priority data bundle for the media session is to be prioritized; and
wherein escalating the priority of the outgoing priority data bundle is in response to the command and further comprises escalating a first priority value of a first task corresponding to processing the outgoing priority data bundle to have a higher priority level than a second priority value of a second task corresponding to processing the other data at the service task, wherein the other data corresponds to a general application running on the operating system and which runs concurrently with the media application, such that transmission of the outgoing priority data bundle is not interrupted by the other data of the general application.

14. The device of claim 13, wherein the media handler is further configured to generate an outgoing group communication to other wireless communication devices in a communication group, wherein the outgoing group communication comprises the outgoing priority data bundle.

15. The device of claim 14, wherein the media handler is further configured to generate the media in the outgoing priority data bundle, wherein the outgoing priority data bundle further comprises a talk spurt in the outgoing group communication.

16. The device of claim 13, wherein the media handler is further configured to selectively assign a port to the application programming interface for media sent therefrom.

17. The device of claim 13, wherein the media handler is further configured to selectively assign a socket to the application programming interface for media sent therefrom.

18. The device of claim 13, wherein the media handler is further configured to assign a respective priority to the application programming interface and at least one other application programming interface, wherein the application programming interface and the at least one other application programming interface selectively yield control of the wireless communication interface according to the respective application programming interface priority.

19. The device of claim 13, wherein the media handler is further configured to send the outgoing priority data bundle to a buffer.

20. The device of claim 13, further comprising an object in one of the plurality of layers configured to selectively assign the application programming interface a direct link to the wireless communication interface based on a request from the application programming interface to transmit the outgoing priority data bundle.

21. The device of claim 13, wherein the media handler is further configured to send an incoming data bundle at the wireless communication interface directly to the application programming interface or another application programming interface without handling of the incoming data bundle by other software layers of the operating system.

22. A wireless communication device, comprising:

means for operating a computer platform on the wireless communication device, the means including a plurality of layers including a processor and an application programming interface configured to handle media and generate an outgoing priority data bundle including media;

means for engaging in wireless communications;

means for dynamically escalating media transmission handling through escalating a priority of the outgoing priority data bundle for processing at the processor such that the outgoing priority data bundle is processed before other data;

means for establishing a media session at a media application running on the operating system, wherein the outgoing priority data bundle is for the media session;

means for sending a command from the application programming interface to a service task in the processor to indicate that the outgoing priority data bundle for the media session is to be prioritized; and means for escalating the priority of the outgoing priority data bundle in response to the command and further comprises means for escalating a first priority value of a first task corresponding to means for processing the outgoing priority data bundle to have a higher priority level than a second priority value of a second task corresponding to means for processing the other data at the service task, wherein the other data corresponds to a general application running on the operating system and which runs concurrently with the media application, such that transmission of the outgoing priority data bundle is not interrupted by the other data of the general application.

23. A computer-readable product, comprising:

a non-transitory computer-readable medium, comprising:

a set of instructions to generate an outgoing priority data bundle including media at an application programming interface on a wireless communication device having a computer platform with an operating system, a processor, and a wireless communication interface, the operating system including a plurality of layers including an application programming interface that handles media, a set of instructions to escalate a priority of the outgoing priority data bundle for processing at the processor such that the outgoing priority data bundle is processed before other data; and a set of instructions to transmit the outgoing priority data bundle from the wireless communication interface;

a set of instructions to establish a media session at a media application running on the operating system, wherein the outgoing priority data bundle is for the media session;

a set of instructions to send a command from the application programming interface to a service task in the processor to indicate that the outgoing priority data bundle for the media session is to be prioritized; and a set of instructions to escalate the priority of the outgoing priority data bundle in response to the command and further comprises a set of instructions to escalate a first priority value of a first task corresponding to a set of instructions to process the outgoing priority data bundle to have a higher priority level than a second priority value of a second task corresponding to a set of instructions to process the other data at the service task, wherein the other data corresponds to a general application running on the operating system and which runs concurrently with the media application, such that transmission of the outgoing priority data bundle is not interrupted by the other data of the general application.

* * * * *